Dec. 23, 1969     H. KUHNE     3,485,888
METHOD OF CARRYING OUT ENDOTHERMIC GAS REACTIONS
Original Filed May 19, 1964     2 Sheets-Sheet 1
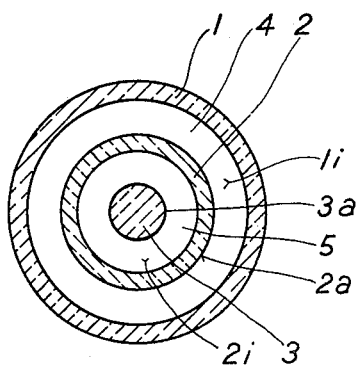
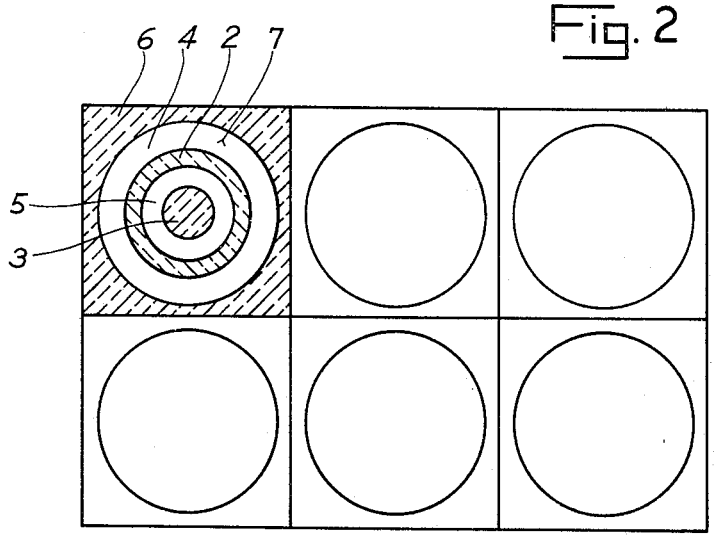
INVENTOR.
HEINZ KUHNE
BY Bair, Freeman & Molinare
ATTORNEYS

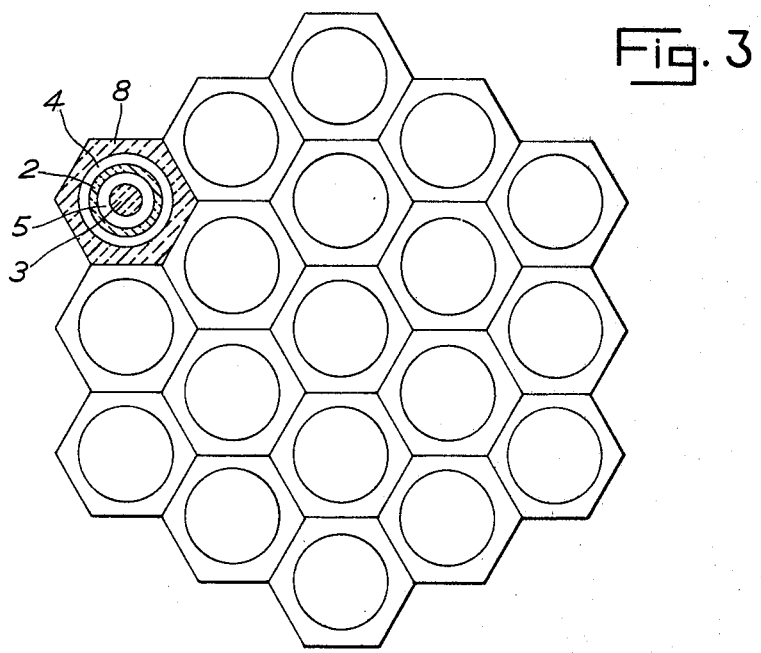
Fig. 3
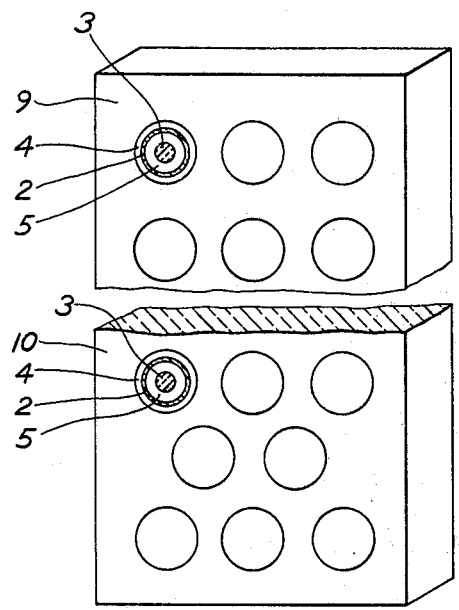
Fig. 4a
Fig. 4b

United States Patent Office

3,485,888
Patented Dec. 23, 1969

3,485,888
METHOD OF CARRYING OUT ENDOTHERMIC GAS REACTIONS
Heinz Kuhne, Kronberg, Taunus, Germany, assignor to Vickers-Zimmer Aktiengesellschaft Planung und Bau von Industrieanlagen
Original application May 19, 1964, Ser. No. 368,540, now Patent No. 3,345,139, dated Oct. 3, 1967. Divided and this application Jan. 16, 1967, Ser. No. 644,031
Claims priority, application Germany, May 24, 1963, Z 10,137
Int. Cl. C07c 11/24
U.S. Cl. 260—679                                    2 Claims

ABSTRACT OF THE DISCLOSURE

Improved method of carrying out endothermic gas reactions by passing the gas or gases to be reacted in an annular reaction space which is concentrically surrounded by but separated from an annular heating chamber and through which a heating gas flows in the same direction as the reactant gas.

---

This invention relates to improvements in a method of carrying out endothermic gas reactions. This application is a division of my copending application Ser. No. 368,540, filed May 19, 1964, titled "Jacketed Annular Reactor Unit," now Patent No. 3,345,139.

In carrying out endothermic gas reactions, one aims at raising the reactants to the requisite high reaction temperature at a speed greater than their rate of decay, supplying the heat necessary for the progress of the reaction, retaining the reaction mixture within the high temperatures range for the space of time needed for the reaction to take place and then cooling it as quickly as possible to a temperature at which the reaction product is stable.

Gas reactions calling for conditions of this kind are, for example, the conversion of hydrocarbons containing from 1 to 4 carbon atoms into acetylene, the conversion of methane and ammonia into hydrocyanic acid or the conversion of hydrocarbons containing from 2 to 6 carbon atoms into ethylene and propylene. For thermo-dynamic and kinetic reasons, technically satisfactory yields can be obtained from such reactions only at temperatures above 1,300° C.–1,500° C., the elevated temperature being maintained for a period of time of the order of $10^{-2}$ to $10^{-5}$ sec., according to the reaction temperature.

The production of such high reaction temperatures for the very short times referred to involves considerable difficulty; and, in fact, all the solutions to this problem that have been put forward hitherto still bring certain disadvantages and weaknesses in their train.

High reaction temperatures and short sojourn times can be achieved, for instance, with the aid of an electric arc, through which the reactants are passed at high velocity. Another way is to carry out the reaction in a flame, a certain amount of the reactants being burnt to supply the requisite heat. With both these methods of producing the reaction, temperatures of upwards of 2,000° C. are achieved in the reacting mixture. Another method, which is basically similar to both of the foregoing, consists in injecting the reactants into a stream of highly heated carrier gases.

The fundamental disadvantage of the solutions outlined above is that the introduction of the heat of reaction and the temperature variations in the reaction mixture cannot be controlled accurately enough to ensure rational utilisation of the energy put in and the adequate suppression of side reactions. With the methods involving partial combustion or highly heated carrier gases, moreover, the desired end product can be obtained in pure form only by subsequent separation processes, which are expensive.

Another suggestion that has been made is that a ceramic grid should be heated by the combustion of heating gas with air or oxygen, the reactants then being led through the heated space, the heat required for the reaction being supplied by the grid. Apart from the fact that here, again, in such a regenerative process, the supply of the heat of reaction and the temperature variations in the reaction mixture cannot be controlled with sufficient precision, it is also frequently found that the temperatures required for optimum reaction conditions are not achieved, owing to the temperature-sensitive nature of the control equipment.

The disadvantages mentioned in connection with the processes described above can be eliminated by the use of reaction ovens, in which ceramic tubes are led through a gas-heated chamber. The reaction gas flows within the tubes, so that any dilution or contamination of the gaseous product by the heating or combustion gases, consequent upon the indirect supply of heat (by heat exchange), is avoided, while at the same time adequate control of the heat of reaction is possible. With such equipment of this kind as is known as technologists, temperatures of up to 1,500° C. can already be obtained.

To achieve short sojourn times (of the order of magnitude referred to above) in such ovens, it is true, tubes of extremely small diameter are necessary. This in turn means that the heat transmission surfaces are very small, so that, for the transmission of the large quantities of heat required to supply the heat requirements of highly endothermic reactions, high wall temperatures are essential, and these can often not be attained, for technical reasons bound up with the materials available and the heating gases at one's disposal. With a view to overcoming this difficulty it has also been proposed that two tubes made of materials capable of withstanding high temperatures should be placed concentrically one within the other, to form an annular reaction chamber through which to pass the flow of reaction gas.

With reaction ovens of the type already described, however, only very few tubes can be accommodated in any one oven unit, since one has to be sure that the same amount of heat will be supplied from all sides to every tube, so that the wall temperature, resulting not only from radiation of the oven walls and heating gases, but also by convective heat exchange with the heating gases, may always be uniform. If the heat transmission be uneven, then the uneven wall temperatures will cause the tubes to undergo deformation, and this, with the refractory materials used, which are highly sensitive to mechanical stresses, may easily lead to breakage or, at the least the risk—with two tubes running one inside the other—that these tubes may be shifted from their concentric position, resulting in distortion of the normally very narrow annular reaction space. Again, there being very few reaction spaces—and these of small cross-sectional area—the performance of the oven naturally falls well below the justifiable minimum for technical equipment.

The invention aims at overcoming this disadvantage of reaction ovens fitted up with annular reaction spaces, each formed by two concentric cylindrical walls of refractory material. This it achieves by virtue of the outer cylindrical wall of the annular reaction space being concentrically surrounded by an annular heating chamber through which a heating gas flows in the same direction as the reactant gas, while the inner cylindrical wall of the reaction space is formed by a cylindrical body concentrically disposed within the outer cylindrical wall, as disclosed and claimed in my aforesaid copending application Ser. No. 368,540.

The solution thus proposed according to the invention enables the outer cylindrical wall of each and every reaction space to be brought, by means of the heating gas, to a wall temperature that is well defined and which is not only uniform round the periphery, but also undergoes uniform variation throughout its length; in addition to which, by radiation from the outer cylindrical wall, a correspondingly uniform temperature is also produced on the inner cylindrical wall of the reaction space; nor can there be any disturbing influence due to radiation from an adjacent reaction tube or from any outer wall of the reaction oven or due, either, to uneven radiation or convective heat transmission from the heating-gas space. This in turn enables a multiplicity of reaction spaces to be brought together within a single oven unit and hence makes it possible to increase the performance of each oven unit several times over, while reducing the risk of breakages as compared with the gas-heated reaction ovens in this type known hitherto.

In one preferred form of the invention, a moulded body of refractory brick is provided with a cylindrical opening, inside which a tube of refractory material is housed concentrically, and concentrically within this tube a cylindrical body is similarly placed. It is desirable for a number of such cylindrical openings to be provided in one such moulded body and/or for a number of moulded bodies to be put together to form one block reactor with the cylindrical openings lying parallel.

Some embodiments of the apparatus used in conjunction with the method of this invention will now be described by way of example, reference being made to the accompanying drawings, in which:

FIGURE 1 is a diagrammatic cross-section of one form of the jacketed annular reactor unit used in the method of this invention;

FIGURE 2 is a diagrammatic cross-section of another form of the jacketed annular reactor unit used in the method of this invention;

FIGURE 3 is a modification of the form shown in FIGURE 2; and

FIGURES 4a and 4b are further modifications of the form shown in FIGURE 2.

The principle of the invention can best be explained by reference to FIGURE 1. In this example, an outer cylindrical tube 1, an intermediate tube 2 and an inner cylindrical insertion 3 are arranged concentrically. The cylindrical insertion 3 may be solid as shown, but for reasons of manufacturing technique, as well as on account of weight considerations, it may with advantage consist of a tube closed at one end, which will serve the same purpose. The annular space 4 formed between the inner wall 1i of the outer tube 1 and outer wall 2a of the intermediate tube 2, is intended for the flow of heating gases, while the annular space 5 formed between the inner wall 2i of the intermediate tube 2 and the outer wall 3a of the insertion 3, is intended for the flow of reaction gas, the heating and reaction gases flowing in the same direction.

The result of this form of construction is that the heating gases supply heat to the inner face 1i of the tube 1 and to the outer face 2a of the tube 2 by convective transfer, the magnitude of which can be pre-determined by the gas velocity. By reason of the uniform cross-sectional area of the annular space 4 and of the uniform speed of flow of the heating gas, this transference of heat is completely uniform round the periphery of the tube and subject to uniform variation along the length of the tube, according to the temperature gradient of the heating gas in the direction of flow. Similar conditions also apply to the heat transference by radiation from the inner wall 1i of the tube 1 to the outer wall 2a of the tube 2, which, as a "secondary heating effect," brings about a definite further rise in the heat output passing by convection from the heating gas to the tube 2. The result is that there is a precisely defined transmission of heat in each surface component of tube 2 and hence a precisely defined wall temperature.

The foregoing considerations concerning the heat output side (tubes 1 and 2) apply similarly to the heat intake side constituted by the tube 2 and the cylindrical insertion 3. The inner wall 2i of the tube 2 (heated from outside) yields up heat by convective transfer to the reaction gas flowing in the annular space 5. At this same time, radiant heat passes from the wall surface 2i to the outer face 3a of the cylindrical insertion 3, so that this face acts as a secondary heating surface. On the heat intake side, too, by reason of the concentric arrangement of the faces 2i and 3a and the uniform speed of flow of the reaction gas in the annular space 5, the temperature conditions are uniform round the periphery and subject to uniform variation in the direction of flow.

The two tubes 1 and 2, as well as the cylindrical insertion 3, are of a refractory material, ordinarily a sintered ceramic, which is extremely sensitive to differences in wall temperature. The complete and entirely reliable uniformity of the wall temperatures obtained with the arrangement just described now enables a large number of such tubes to be assembled together, without adjacent tubes and/or the outer walls of the oven exercising any secondary influence counter to the unformity of wall temperatures achieved. The performance of individual oven units can therefore be materially improved, while simultaneously the operational reliability is enhanced and, as already mentioned, the specific output of the heating surface areas is increased.

At the same time, the fact that the reaction and heating gases flow in the same direction avoids the production of excessively high local maximum temperatures (each as would arise, particularly at the point of entry of the heating gas into the annular space 4, if the gases flowed in opposite directions) and thus has the effect of equalising the temperature conditions along the length of the oven. This also means that the heating gas can be admitted at higher temperatures, the air of combustion being recuperatively pre-heated by the burnt gases flowing from the reaction oven. The adoption of this measure does not lead to any increase in the specific transference of heat at the entry to the oven and so to a shortening of the duration of heating or a reduction in the length of the reaction gas heating zone, but it results in a considerable improvement in the thermal efficiency of the reaction that takes place.

Since the available refractory materials can often not be kept sufficiently gastight, particularly at high operating temperatures, the reactor may with advantage be run in such a way that the reaction gas and the heating gas, flowing in the same direction, are at the same pressure and exhibit the same pressure gradient throughout the entire length of the tubes. Since the flow resistance of a gas is dependent on volume, this can be effected by means of suitable volume regulating devices, which in themselves are well known and hence need not be further described in detail as lying within the scope of the present invention. If, however, some slight pressure difference between the reaction and heating gases can be tolerated, the reaction gas should be at a somewhat higher pressure than that of the heating gas, to avoid contamination of the reaction product.

FIGURE 2 shows one advantageous form which the invention may take. In this, in contradistinction to the form shown in FIGURE 1, the outer tube 1 is replaced by a moulded brick 6—of square cross-section, for example—which is formed with a circular-section passage 7. This passage 7 fulfills the function of the inner wall 1i of the tube 1, described above. As with the form of construction illustrated in FIGURE 1, the intermediate tube 2 and the cylindrical insertion 3 are arranged concentrically within the pasasge 7, so that annular spaces 4 and 5 are created for the heating gas and the reaction gas, respectively.

The moulded brick 6, as are the other components of the equipment, is formed of a refractory material. It may be made, for instance, by the compression of a refractory material in powder form (such as corundium, zirconia or the like) in a mould, followed by sintering. The tube 2 and the insertion 3 (which can both be made in the usual manner) should, but need not, consist of the same refractory material as the moulded brick 6.

As will be clear from FIGURE 2, several such moulded bricks 6 can be assembled to form a reactor block, with passages 7 (and hence also annular reaction spaces 5) lying parallel to one another. As each of the reaction spaces 5 is surrounded by an outer heating space 4, complete gas impermeability is not absolutely essential in the moulded bricks 6. Whatever traces of heating gas may escape outwards from one of the annular spaces 4 will at most reach the corresponding heating-gas space in an adjacent moulded brick. This will not cause any trouble, so long as the leakage is not excessive. With a reaction oven built up from moulded bricks, moreover, the normally rather poor heat conductivity of such refractory materials as can be employed in the present case (which applies to zirconia, for instance) has no further harmful effect, since the annular space for the heating gas surrounds the annular space for the reaction gas.

It is not essential for the moulded bricks to be square in section. FIGURE 3 shows an alternative method of construction, in which moulded bricks 8 are hexagonal in section and are assembled with the tube units in staggered formation.

A further possibility lies, as shown in FIGURES 4a and 4b, in the use of slabs shown at 9 and 10 respectively, formed with a plurality of parallel passages 7 which, as shown in FIGURE 4a may be disposed in rows and columns or, as shown in FIGURE 4b may be staggered.

In one practical example—particularly suitable for the pyrolytic conversion of methane into acetylene—of the individual forms of the invention already described, the width of the reaction-gas space 5 may be approximately 4 mm. and that of heating-gas space 4 approximately 8 mm., for an effective tube length of 1.9 m. If the insertion 3, in the form of a tube closed at one end and having a wall thickness of about 1.5 mm., has an outside diameter of approximately 7 mm., and if the wall thickness of the inner tube 2 is approximately 2.5 mm., the inside diameter of outer tube 1 (or of the passage 7 in the moulded brick, as the case may be) will be about 36 mm. If such a reactor be run with an admission temperature of 2,200° C. for the heating gas and an admission temperature of 1,000° C. for the reaction gas, both gases being admitted at the same pressure of a trifle over 1 atm. abs. and having the same low pressure gradient along the reactive length, then, if the speed of flow of the reaction gas in annular space 5 be of the order of 100 m./sec., the heating zone will be approximately 0.5 m. long and the reaction zone approximately 1.4 m. long, the mean time of sojourn of the reaction gas in the reaction zone being approximately $10^{-2}$ sec. and its maximum temperature about 1,600° C. to 1,650° C., and the reaction gas will leave the annular reaction space (to pass into a subsequent cooling stage) at about 1,500° C., the heating gas leaving the annular heating space at about 1,750° C. This mode of operation means that, for each tube, about 6,300 Kcal./hr. of perceptible heat and heat of reaction will be transformed and that the specific heat output per unit area, referred to the mean heating-tube diameter (17.5 mm.), lies in the region of 60,000 Kcal./sq. m./hr. It has also been found that, in practice, any number of reactors desired may be brought together to form a single oven unit, without any difficulties arising or—notwithstanding the length of the tubes—even any intolerable deviations being observed from the nominal dimensions of spaces 4 and 5.

What I claim is:

1. In an endothermic gas reaction process which includes the steps of (1) passing a reactant gas into a reaction zone, (2) heating said reactant gas to reaction temperature at a speed greater than the rate of decay until a reaction product is formed, and (3) rapidly cooling reaction product gas to a temperature at which said product is stable, the improvement which comprises:
   (a) passing said reactant gas through a first annular reaction zone,
   (b) passing a heating gas through a separate, second annular zone concentrically and outwardly spaced from said annular reaction zone, said reactant gas being heated substantially only by transfer of heat from said heating gas to said reactant gas,
   (c) maintaining both said reactant gas and said heating gas flowing through their respective annular zones in the same direction,
   (d) maintaining the pressure of said reactant gas not less than the pressure of said heating gas to prevent any substantial amount of contamination of reactant gas or reaction product with heating gas,
   (e) regulating the flow of said reactant gas and heating gas to maintain a substantially similar pressure gradient throughout the length of both said annular zones,
   (f) maintaining said reactant gas in said annular reaction zone for a residence time on the order of from about $10^{-2}$ to $10^{-5}$ seconds and sufficient to complete reaction,
   (g) withdrawing reaction product from said first annular zone without need for separation of heating gas therefrom, whereby thermal efficiency of the reaction is improved, variations in temperature in said reaction zone are controlled pursuant to a predetermined gradient without formation of hot spots causing product decay, and side reactions are suppressed.

2. A process as in claim 1 wherein:
   (a) said reaction gas is methane,
   (b) the pressure of said reactant gas admitted into said annular reaction zone and said heating gas admitted into said annular heating zone being about 1 atmosphere absolute,
   (c) the flow of said reaction gas being about 100 m./sec., and
   (d) the reactant gas being heated to a maximum temperature between about 1,600–1,650° C., whereby said methane is pyrolitically reacted in said annular reaction zone to produce acetylene.

References Cited

UNITED STATES PATENTS

| | | | |
|---|---|---|---|
| 1,934,610 | 11/1933 | Wheeler | 23—151 |
| 2,069,545 | 2/1937 | Carlisle et al. | 23—151 |
| 2,596,421 | 5/1952 | McKinnis | 23—151 |
| 2,779,662 | 1/1957 | Frey | 23—202 |
| 2,823,982 | 2/1958 | Saladin et al. | 23—202 |
| 2,937,923 | 5/1960 | Shapleigh | 23—1 |
| 2,942,043 | 6/1960 | Rummert | 23—1 XR |
| 3,004,822 | 10/1961 | Poorman et al. | 23—1 |
| 3,345,139 | 10/1967 | Kuhne | 23—1 XR |

EDWARD STERN, Primary Examiner

U.S. Cl. X.R.

23—1, 151; 260—683